Aug. 1, 1933.  E. E. HEWITT  1,920,938
VALVE LOADING DEVICE
Original Filed May 11, 1929
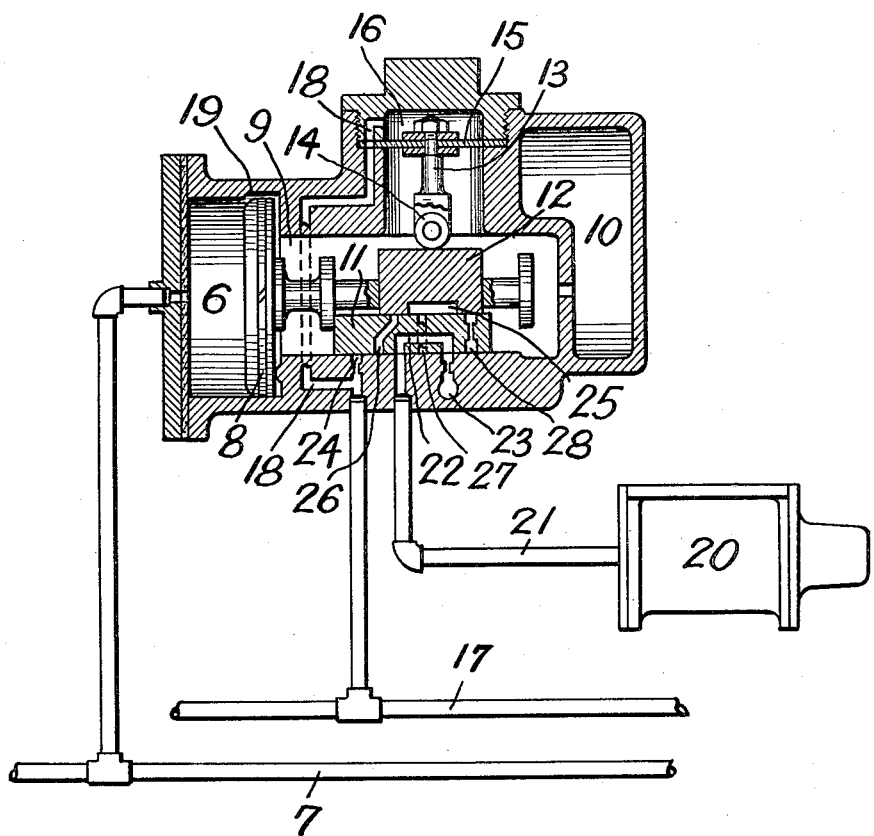
INVENTOR
ELLIS E. HEWITT
BY *Wm. M. Cady*
ATTORNEY

Patented Aug. 1, 1933

1,920,938

UNITED STATES PATENT OFFICE 1,920,938

VALVE LOADING DEVICE

Ellis E. Hewitt, Edgewood, Pa., assignor to The Westinghouse Air Brake Company, Wilmerding, Pa., a Corporation of Pennsylvania Application May 11, 1929, Serial No. 362,333
Renewed August 12, 1932

9 Claims. (Cl. 303—1)

This invention relates to fluid pressure apparatus and more particularly to valve devices therefor.

Valve devices have heretofore been proposed in which a slide valve is adapted to be actuated by a piston upon variations in pressures on the opposite sides of the piston. In such devices, the slide valve has controlled ports in a slide valve seat charged with fluid under pressure and if the pressure acting on the exposed faces of the slide valve is sufficiently reduced, then the pressure acting in said ports tends to unseat the slide valve, permitting foreign matter to accumulate on the valve seats and damage the same.

It has also been proposed to incorporate in the valve mechanisms spring pressed means for maintaining the slide valves properly seated, such spring pressed means being designed to supplement the fluid under pressure acting on the exposed faces of the slide valves. When springs are used for the above purpose, certain difficulties are encountered. If the tension of the springs is increased an amount sufficient to overbalance the pressures on the seated area of the slide valves when the pressure of the fluid in the valve chamber is reduced, the valves will be pressed too firmly against their seats to permit them to readily move in the intended manner. In order to obviate this difficulty, the tension of the springs must necessarily be reduced to the minimum, in which case the pressure acting on the slide valves to maintain the same properly seated, is insufficient to prevent the unseating of the slide valves by the higher pressure acting on the seated faces thereof.

An object of the invention is to provide a valve loading device which is operated by fluid pressure.

Another object of the invention is to provide a valve mechanism of the above type with means for maintaining a substantial constant pressure against the slide valve to hold the same on its seat irrespective of the amount of pressure of fluid acting directly on the exposed face of the slide valve.

Another object of the invention is to provide valve mechanism of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mostly in section, of a valve mechanism embodying the invention.

Referring to the drawing, the valve device may comprise a casing having a piston chamber 6 connected to the brake pipe 7 and containing a piston 8 and a valve chamber 9, connected to a volume chamber 10 and containing a main slide valve 11 and a graduating slide valve 12 adapted to be operated by piston 8.

In order to hold the slide valves 11 and 12 to their seats against fluid pressure acting below the valves, a pressure device may be provided comprising a member 13 having a roller 14 acting on the upper slide valve 12. The outer end of the member 13 is connected to a diaphragm 15 which is suitably mounted in the casing.

On one side the diaphragm 15 is subject to the pressure of fluid in the valve chamber 9, while on the opposite side, the diaphragm is subject to the pressure of fluid in a chamber 16. The chamber 16 is connected to a fluid pressure supply pipe 17 by a passage 18.

In operation, when the brake pipe 7 is charged with fluid under pressure, fluid flows to piston chamber 6 and therein acts on piston 8 to shift the same to the release position shown in the drawing. In this position, the feed groove 19 is uncovered, which permits fluid under pressure to flow from the piston chamber 6 to the valve chamber 9 and from thence to the volume chamber 10, charging said chamber.

With the piston 8 and slide valves 11 and 12 in release position, the brake cylinder 20 is connected to the atmosphere through pipe and passage 21, cavity 22 in the main slide valve 11, and atmospheric exhaust port 23.

Fluid at the pressure supplied to pipe 17 flows through a passage 24 to the seat of the main slide valve 11, tending to unseat the same, and through passage 18 to the diaphragm chamber 16 at the upper side of the diaphragm 15.

In this way the slide valves 11 and 12 will be held on their seats by the pressure of fluid in valve chamber 9 when the pressure of the fluid in the chambers 9 and 16 are substantially equal. However, should the pressure of the fluid in chamber 16 become greater than the pressure of the fluid in valve chamber 9, then this greater force, acting on the opposite face of the diaphragm 15, will be transmitted through the member 13 and roller 14 to the slide valves 11 and 12 and the slide valves 11 and 12 will be held seated by the pressure of the fluid in the diaphragm chamber 16. It will be understood that when the pressures of the fluid in the chambers on the opposite faces of the diaphragm 15 are substantially equal, the diaphragm will be ineffective and the slide valves will be maintained properly seated by the pressure of the fluid in the valve chamber 9.

When the pressure is reduced in the brake pipe 7 to effect an application of the brakes in the usual manner, the pressure reduces in piston chamber 6 and the piston 8 and slide valves 11 and 12 are moved to service position by the pressure of fluid in valve chamber 9 and volume chamber 10.

In service position, cavity 25 in the graduating slide valve 12 connects ports 26 and 27 in the main slide valve 11, which ports register with passage 24 from the fluid pressure supply pipe 17 to passage 21 leading to the brake cylinder 20, thereby allowing fluid under pressure to flow to the brake cylinder and apply the brakes.

In service position, the valve chamber 9 is connected to the atmosphere through port 28 in the main slide valve 11 and atmospheric passage 23, which allows the pressure of the fluid in the valve chamber 9 and the volume chamber 10 to reduce at substantially the same rate as the brake pipe pressure is reduced in the piston chamber 6.

As the pressure is reduced in the valve chamber 9, and since the pressure of the fluid in chamber 16 is maintained constant, the decrease in valve chamber pressure is offset by the increased downwardly acting pressure on the diaphragm 15 created by the reduction in pressure on the lower side of the diaphragm. Consequently the pressure acting on the slide valves 11 and 12 to maintain the same seated remains constant. For instance, if the pressure in valve chamber 9 is reduced ten pounds in effecting a service application of the brakes, the difference in pressure acting on the diaphragm 15 increases an equal amount, and this offsets the reduction of the pressure in the valve chamber 9.

It will be noted that it is not essential that the normal pressures carried in the brake pipe 7 and the fluid pressure supply pipe 17 be equal when the brakes are released, but either pressure may be greater than the other and the desirable results of the invention will still be obtained.

In order to release the brakes, fluid under pressure is again supplied to the brake pipe 7 and piston chamber 6, thereby causing the triple valve to be shifted to release position, in which position the valve chamber 9 and the volume chamber 10 are recharged, and the brake cylinder 20 is connected to the atmosphere in the manner hereinbefore described.

When a spring is used to force the member 13 against the slide valves, as has heretofore been the practice, the spring had a pressure sufficient to hold the valves properly seated when the valve chamber was empty, and the pressure against the valves would, of course, be increased when the pressure of the fluid in the valve chamber was increased. In other words, the load on the slide valves would vary in proportion to variations in the valve chamber fluid pressure, and this often resulted in stuck valves, as well as undue wear on the parts.

By the present invention, when the device is in release position, the force acting on the slide valves will be only that force which is produced by the pressure of the fluid in valve chamber 9, if the pressures in the chambers 9 and 16 are substantially equal. When the valve chamber pressure is reduced when an application of the brakes is being effected, there will be no reduction in the pressure in diaphragm chamber 16. Therefore, the pressure in said chamber, acting on the diaphragm, will maintain a pressure against the slide valves with substantially the same force as is the case when the pressures are approximately equal in both chambers 9 and 16.

In this way, the load applied through the member 13 and the roller 14 to the valves is applied only as the pressure in the valve chamber reduces, and such load is proportional to such reduction. Therefore, the combined load on the slide valves due to pressure in valve chamber 9 and load on the roller 14 may be approximately constant or vary in proportion to the relative exposed areas of the diaphragm and slide valve and not greater than that due to full pressure in the valve chamber 9.

Furthermore, the pressure between the roller 14 and the slide valves will only be applied to a degree corresponding to the drop in pressure in the valve chamber 9.

Among the advantages obtained by the present invention are: less wear on the roller and slide valves; less friction between the slide valves and their seats, therefore requiring a smaller piston to move the slide valves for a given differential on the face of the piston.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A valve device for fluid pressure apparatus including a valve in a valve chamber, and fluid pressure operated means subject to the opposing pressures of said chamber and a substantially constant pressure for holding said valve to its seat.

2. A valve device for fluid pressure apparatus including a valve in a valve chamber, and fluid pressure operated means subject to the opposing pressures of said chamber and a substantially constant pressure for holding said valve to its seat upon a reduction in fluid pressure in said chamber.

3. A device of the class described comprising a valve in a chamber subject to fluid under pressure, means operated by variations in fluid under pressure for actuating said valve, and means subject to the opposing pressures of said chamber and a substantially constant pressure for holding said valve to its seat upon a reduction in fluid pressure in said chamber.

4. A device of the class described comprising a chamber, a valve slidably mounted in said chamber, means for actuating said valve, a diaphragm subject to the opposing pressures of fluid in said valve chamber and a second chamber, and means carried by said diaphragm and engaging said valve for holding the same to its seat.

5. A device of the class described comprising a valve in a valve chamber, and a diaphragm device subject to the opposing pressures of said valve chamber and another chamber for holding said valve to its seat.

6. In a fluid pressure brake apparatus, the combination with a brake pipe, and a chamber, of a valve device operative upon an increase in brake pipe pressure to supply fluid under pressure to said chamber and operative upon a reduction in brake pipe pressure to vent fluid under pressure from said chamber, said valve device comprising a slide valve normally pressed into engagement with its seat by fluid under pressure in said chamber, means operated upon a reduction in the pressure of fluid in said chamber for exerting a seating pressure on said slide valve, and means for transmitting the seating pressure from the first-mentioned means to said slide valve.

7. In a fluid pressure brake apparatus, the combination with a brake pipe, and a chamber, of a valve device operative upon an increase in brake pipe pressure to supply fluid under pressure to said chamber and operative upon a reduction in brake pipe pressure to vent fluid under pressure from said chamber, said valve device comprising a slide valve normally pressed into engagement with its seat by fluid under pressure in said chamber, means operated upon a reduction in the pressure of fluid in said chamber for exerting a seating pressure on said slide valve according to the reduction in the pressure of fluid in said chamber, and a strut for transmitting the seating pressure from said means to the slide valve.

8. In a fluid pressure brake apparatus, the combination with a brake pipe, and a chamber, of a valve device operative upon an increase in brake pipe pressure to supply fluid under pressure to said chamber and operative upon a reduction in brake pipe pressure to vent fluid under pressure from said chamber, said valve device comprising a slide valve normally pressed into engagement with its seat by fluid under pressure in said chamber, and means operated upon a reduction in the pressure of fluid in said chamber for exerting a seating pressure on said slide valve, said means being rendered ineffective to exert pressure on said valve upon substantially fully charging said chamber with fluid under pressure.

9. In a fluid pressure brake apparatus, the combination with a brake pipe, and a chamber, of a valve device operative upon an increase in brake pipe pressure to supply fluid under pressure to said chamber and operative upon a reduction in brake pipe pressure to vent fluid under pressure from said chamber, said valve device comprising a slide valve normally pressed into engagement with its seat by fluid under pressure in said chamber, pressure sensitive means operated upon a reduction in the pressure of fluid in said chamber for exerting a seating pressure on said slide valve, and a strut interposed between and cooperating with said pressure sensitive means and slide valve for transmitting the seating pressure from the pressure sensitive means to the slide valve.

ELLIS E. HEWITT.